(12) United States Patent
Mustoe et al.

(10) Patent No.: US 6,980,996 B1
(45) Date of Patent: Dec. 27, 2005

(54) GENERIC COMMAND INTERFACE FOR MULTIPLE EXECUTABLE ROUTINES HAVING CHARACTER-BASED COMMAND TREE

(75) Inventors: Paul Leon Mustoe, Midlothian, VA (US); Monica Raut, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/798,963

(22) Filed: Mar. 12, 2004

Related U.S. Application Data

(60) Division of application No. 09/778,773, filed on Feb. 8, 2001, now Pat. No. 6,738,781, which is a continuation-in-part of application No. 09/604,880, filed on Jun. 28, 2000.

(51) Int. Cl.$^7$ ............................................. G06F 17/30
(52) U.S. Cl. ........................... 707/102; 707/3; 707/10; 717/143; 719/320
(58) Field of Search ...................... 707/4, 5, 10, 103 R, 707/3, 102; 709/203, 217, 219, 328; 717/143; 719/321, 328, 320

(56) References Cited

U.S. PATENT DOCUMENTS

| | | | |
|---|---|---|---|
| 4,837,798 A | | 6/1989 | Cohen et al. |
| 5,086,504 A | | 2/1992 | Nemeth-Johannes et al. |
| 5,379,419 A | * | 1/1995 | Heffernan et al. ............. 707/4 |
| 5,491,796 A | * | 2/1996 | Wanderer et al. ........... 709/224 |
| 5,680,622 A | | 10/1997 | Even |
| 5,732,274 A | | 3/1998 | O'Neill |
| 5,790,863 A | | 8/1998 | Simonyi |
| 5,835,757 A | * | 11/1998 | Oulid-Aissa et al. ......... 707/10 |
| 5,864,843 A | | 1/1999 | Carino et al. |
| 5,911,072 A | * | 6/1999 | Simonyi ..................... 717/105 |
| 6,134,709 A | | 10/2000 | Pratt |
| 6,138,098 A | | 10/2000 | Shieber et al. |
| 6,226,655 B1 | * | 5/2001 | Borman et al. .......... 715/501.1 |
| 6,263,339 B1 | * | 7/2001 | Hirsch ........................ 707/102 |
| 6,282,547 B1 | * | 8/2001 | Hirsch ........................ 707/102 |
| 6,397,263 B1 | | 5/2002 | Hancock et al. |
| 6,405,209 B2 | | 6/2002 | Obendorf |
| 6,405,265 B1 | * | 6/2002 | Kronenberg et al. ........ 719/321 |
| 6,405,365 B1 | | 6/2002 | Lee |
| 6,516,356 B1 | * | 2/2003 | Belknap et al. ............. 709/328 |
| 6,654,747 B1 | * | 11/2003 | Van Huben et al. .......... 707/10 |

* cited by examiner

Primary Examiner—Shahid Alam
(74) Attorney, Agent, or Firm—Leon R. Turkevich

(57) ABSTRACT

A processor based system includes a parser, configured for identifying whether an input word received from a user is a new command word relative to a character-based command parse tree, and a tree management process configured for managing the character-based command parse tree. The character-based command parse tree includes multiple element levels for respective character positions for each known command word, and at least one character element at each level. Each character element specifies at least one corresponding character component and a corresponding at least one index value. The parser determines whether the input word is a new command word based on whether the characters of the input word match successive elements, with the last character matching an end node, within the character-based parse tree; if the parser determines that the input word is a new command word, the tree management process performs update operations to accommodate the new command word, including updating the character-based command parse tree with the new command word.

7 Claims, 5 Drawing Sheets

GENERIC COMMAND INTERFACE FOR MULTIPLE EXECUTABLE ROUTINES HAVING CHARACTER-BASED COMMAND TREE

CROSS REFERENCE TO RELATED APPLICATIONS

This application is a divisional of application No. 09/778,773, filed Feb. 8, 2001, now U.S. Pat. No. 6,738,781, which is a continuation-in-part of commonly-assigned, copending application Ser. No. 09/604,880, filed Jun. 28, 2000, entitled GENERIC COMMAND INTERFACE FOR MULTIPLE EXECUTABLE ROUTINES, the disclosure of which is incorporated in its entirety herein by reference.

BACKGROUND OF THE INVENTION

1. Field of the Invention

The present invention relates to command and interface control of Operating Administration and Monitoring (OAM) executable routines within software systems.

2. Description of the Related Art

Operating Administration and Monitoring (OAM) tools are software-based resources used as administration and/or diagnostic tools for complex processor-based executable software systems, such as software-based unified messaging software systems. A subset of OAM tools includes Real Time Monitoring (RTM) programs, used to monitor and control selected states and processes within the software based system. For example, a given RTM program may generate a real-time display (i.e., "a screen") of selected parameters during execution of a prescribed process; the RTM program may also provide a diagnostic resource that enables resetting of various states or variables within the prescribed process. Other administration and diagnostic tools include external binary files that execute in response to a procedure call, and Simple Network Management Protocol (SNMP) agents or scripts configured for generating an e-mail message as an alarm in response to a detected event.

Hence, system administrators may attempt to utilize multiple tools within a software system in order to increase the available administration and diagnostic tools for improved system performance. The use of multiple RTM programs and other OAM tools, however, requires the users to remember the names and syntaxes of numerous commands for the respective RTM programs and OAM tools. Hence, an increase in the number of OAM tools would result in the system administrator needing to develop expertise in the command names and syntaxes for the respective OAM tools.

The commonly-assigned, copending application Ser. No. 09/604,880 discloses validation of a generic command relative to a command parse tree. The command parse tree includes multiple elements, each specifying at least one corresponding generic command component and a corresponding command action value. A parser, upon identifying a best match between the command parse tree elements and the received generic command, issues a prescribed command for a selected management program according to the corresponding command format. Hence, a user may control multiple management programs having respective command formats in a manner that eliminates the necessity that the user needs to know detailed command formats and syntaxes of each management program.

The addition of new commands, however, requires maintenance processing for the addition of new elements to the command parse tree. For example, each word in the new command needs to be compared to a dictionary of valid words in the system. In addition, for any new words found, a token number needs to be defined, and the word to token algorithm needs to be modified to include any new word in the string to token encoding.

SUMMARY OF THE INVENTION

There is a need for an arrangement that enables a simple command language to be utilized for control of multiple RTM programs having respective command formats, wherein new commands can be automatically added without manual reconfiguration of the system by a system administrator.

These and other needs are attained by the present invention, where a processor based system includes a parser, configured for identifying whether an input word received from a user is a new command word relative to a character-based command parse tree, and a tree management process configured for managing the character-based command parse tree. The character-based command parse tree includes multiple element levels for respective character positions for each known command word, and at least one character element at each level. Each character element specifies at least one corresponding character component and a corresponding at least one index value. The parser determines whether the input word is a new command word based on whether the characters of the input word match successive elements, with the last character matching an end node, within the character-based parse tree; if the parser determines that the input word is a new command word, the tree management process performs update operations to accommodate the new command word, including updating the character-based command parse tree with the new command word.

One aspect of the present invention provides a method in a processor-based system configured for executing a plurality of management programs according to respective command formats. The method includes receiving from a user an input word representing at least a portion of a generic command, and determining whether the input word is a new command word relative to a character-based command parse tree configured for identifying known command words. The method also includes selectively adding the input word to the character-based command parse tree based on determining that the input word is a new command word. The method also includes validating the generic command, and issuing a prescribed command of a selected one of the management programs according to the corresponding command format, based on validating the generic command.

Another aspect of the present invention provides a system configured for executing a plurality of management programs according to respective command formats. The system includes a parser configured for accessing a character-based command parse tree for identifying whether an input word of a generic command received from a user is a new command word, and a command parse tree for validating the generic command. The system also includes a tree management process configured for selectively adding the input word to the character-based command parse tree and the command parse tree based on a determination that the input word is a new command word, and translators. The translators are configured for issuing commands for the management programs according to respective command formats, the parser outputting a prescribed command to a selected one of the translators based on the validating of the generic command.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an improvement of the generic command interface disclosed in the above-incorporated application Ser. No. 09/604,880, where a character-based command parse tree and a tree management process is added to enable the generic command interface system to automatically update itself upon detecting a new command word. In particular, the character-based command parse tree is used to determine whether an input word is a new command word relative to known command words; if the input word is determined to be a new command word, the tree management process updates the character-based command parse tree and existing data structures within the generic command interface (e.g., the command parse tree and associated command word translation tables), enabling the automatic addition of the new command word.

Hence, the disclosed arrangement eliminates the necessity for manually modifying hard-coded data structures in response to the addition of new command words to the generic command interface, improving the overall flexibility of the generic command interface.

Figure 1:
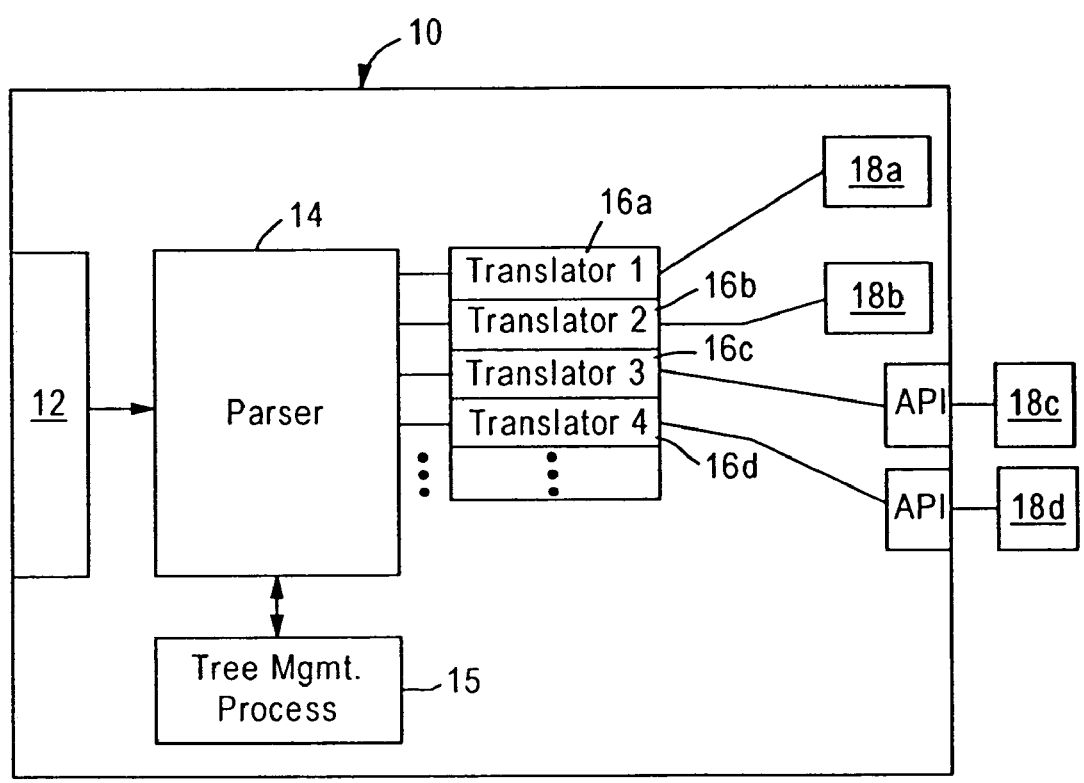
FIG. 1 is a diagram of a system configured for executing multiple management programs according to respective command formats based on a generic command set according to an embodiment of the present invention.

FIG. 1 is a diagram of a system configured for executing a plurality of management programs according to respective command formats according to an embodiment of the present invention. The processor based system 10 includes a user input interface 12, for example a terminal interface, that enables a user to input a generic command string, described below. The processor based system 10 also includes a parser 14 configured for validating the generic command received by the user input interface 12 from the user, an executable tree management process 15 configured for managing parse trees 22 and 23 accessible by the parser 14, and translators 16 configured for issuing commands to respective management programs 18 according to respective command formats. The parse trees 22 and 23 are described below with reference to FIGS. 2A and 2B.

As shown in FIG. 1, the management programs 18, implemented for example by different OAM tools such as RTM programs, may be executed within the processor based system or externally as external agents accessible using a prescribed application programming interface (API). The management programs 18 may provide different administration and maintenance functions, for example initiating various real-time screens used to monitor the internal state of executable processes within the software based system 10; alternately, different tools 18 may allow the user to control the various states within the various component of the software based system 10 via external programs (e.g., programs 18c or 18d), or may be used to issue external alarms (e.g., SNMP manager scripts) for external routines such as message waiting indicator routines.

A disadvantage of utilizing many different tools 18 is that each tool 18 tends to have its own screen and/or command, providing difficulties for the system administrator to determine which tool is the best tool (and/or which is the best syntax) to use for a given problem.

According to the disclosed embodiment, the parser 14 and the translators 16 provide a unified administration and diagnostic tool which incorporates the functionality of all external administrative executable binary files, RTM programs, agent manipulation scripts, and various requested snapshot queries, as well as including an extensive help system. In particular, the parser 14 and the translators 16 provide a generic command syntax that integrates the functionality of the different tools 18 and that automatically selects the appropriate command for the best tool for executing a given generic command. As illustrated in Part A. of the attached appendix, the new syntax provides a generic instruction set that provides an abstraction of the tool-specific command formats and syntax, enabling a user to issue command based on the relative functions, as opposed to the specific syntax for a corresponding tool 18.

In addition, the tree management process 15 enables the data structures within the processor based system 10 to be dynamically updated upon detecting a new command word using the character-based command parse tree 23, described below with respect to FIG. 2B.

Figure 2A:
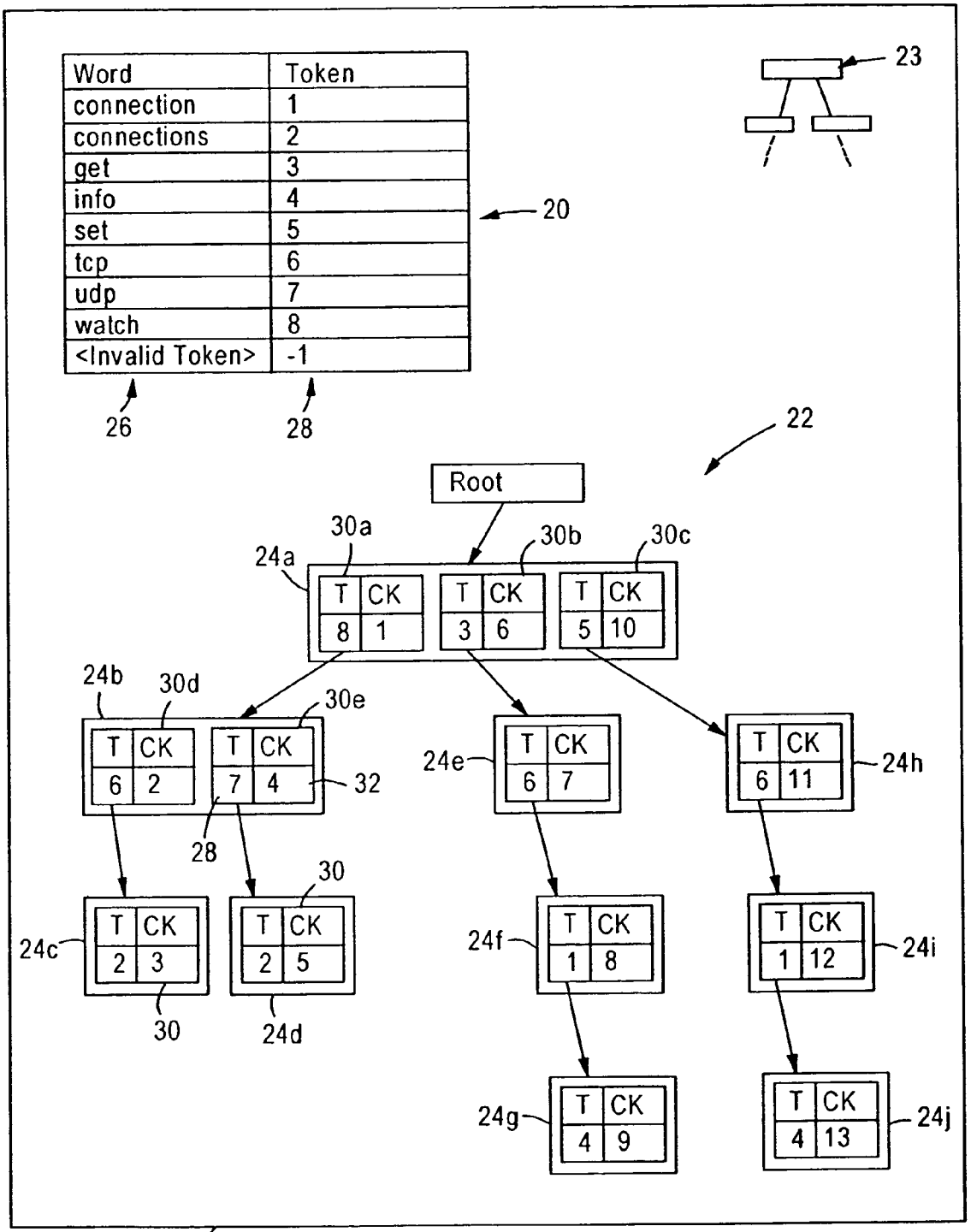
FIGS. 2A and 2B are diagrams illustrating a command parse tree and the character-based command parse tree used by the parser of FIG. 1, respectively, according to an embodiment of the present invention.
Figure 2B:
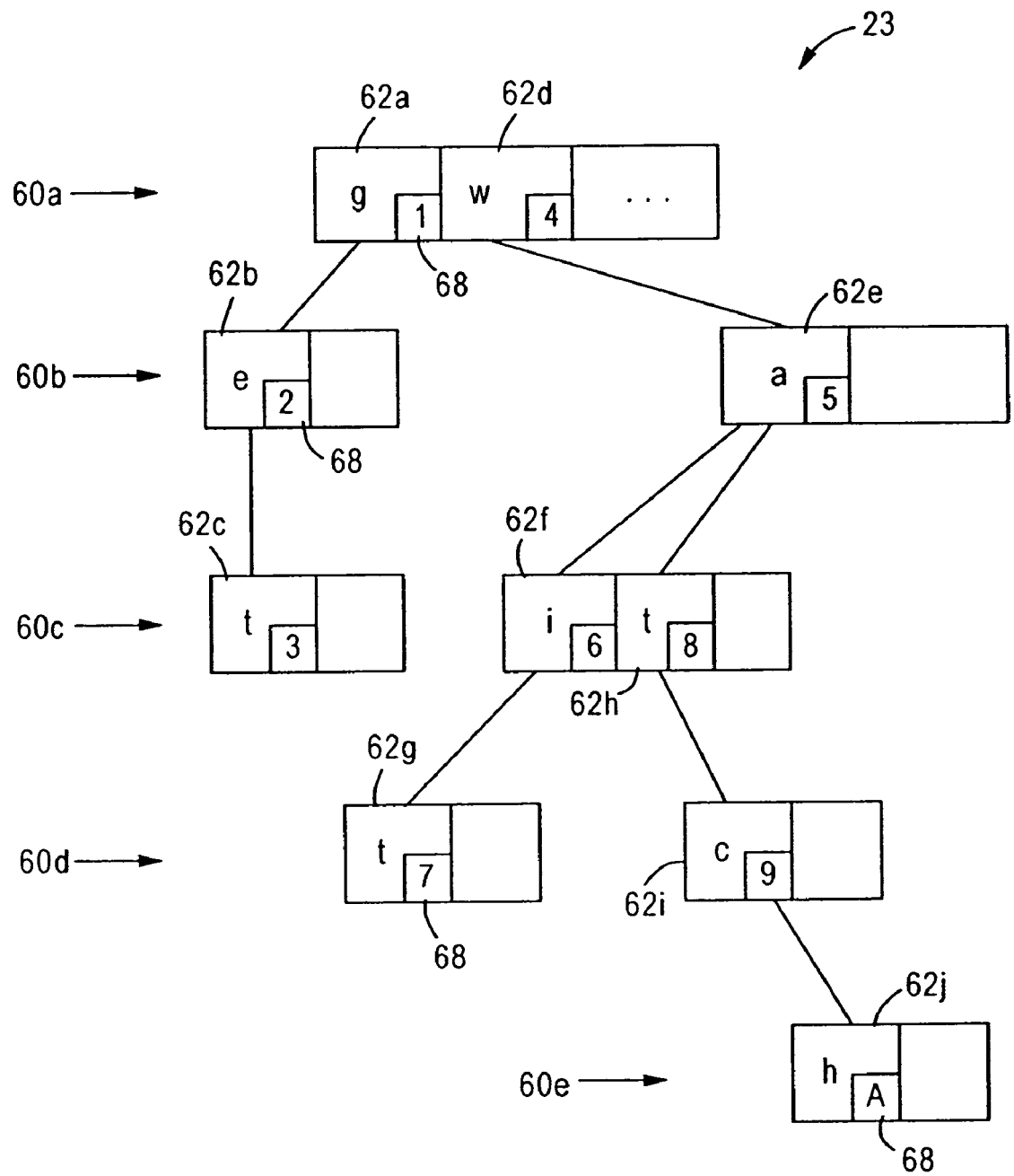

FIG. 2A is a diagram illustrating in detail the parser 14 of FIG. 1 according to an embodiment of the present invention. The parser-14 includes a command word translation table 20, a (word/token based) command parse tree 22, and a character-based command parse tree 23. The character-based command parse tree 23 is illustrated in further detail in FIG. 2B.

The command word translation table 20 of FIG. 2A is configured for storing, for each prescribed command word 26, a corresponding token value 28 that is used by the parser 14 to identify a specific command for a selected one of the translators 16. In particular, the command word translation table 20 includes all the command words 26 that are valid according to the generic syntax, illustrated for example in Part B of the attached appendix.

The parser 14 is configured for determining whether an input word is a new command word or a known command word using the character-based command parse tree 23, and validating a received generic command. In particular, assuming an input generic command includes all known command words, the parser 14 validates the received generic command by comparing each input command word to the command parse tree 22 to determine for the received generic command a tree element 24 identified as a best match. Each tree element 24 includes at least one token-command key pair 30 that specifies a token (T) 28 and a corresponding command key (CK) 32, enabling the parser 14 to identify the appropriate prescribed command based on the command key specified for the matching token. In particular, the parser 14 recursively traverses the command parse tree 22 for each command word to identify the best match for the generic command. If only a portion of the generic command is identified as valid (e.g., only the first three command words are valid), the parser 14 selects the command key 32 for the matching token 28 from the last valid tree element 24.

As described above, the parser 14 is configured for accessing whether an input word is a new command word or a known command word using the character-based command parse tree 23. The character-based command parse tree 23, illustrated in FIG. 2B, includes multiple levels 60 of character elements 62 representing characters of known command words. Each character element 62 has a corresponding character component and a corresponding integer word key 68 (i.e., index value) that uniquely identifies the character element 62. Hence, each known known command word is identified by a corresponding word token identified by the word key 68 of the last character of the word, where the word "get" has a corresponding word token "3" from the word key 68 of character element 62c, and the word "watch" has a corresponding word token "A" (hexadecimal representation for "10") from the word key 68 of character element 62j. In addition, each level 60 corresponds to a character position of a known command word, where the root level 60a includes character elements 62a and 62d that correspond to the initial character of known command words "get", "wait", and "watch". The adjacent levels 60b, 60c, 60d, and 60e are used to identify the second, third, fourth, and fifth character positions of a command word, respectively.

Hence, the parser 14 is able to determine that the input word "get" is a known command word based on parsing the tree 23 on a character by character basis until the last character of the word matches an end node. Similarly, the parser 14 is able to determine that the input word "wait" is a known command word based on parsing the tree 23 to reach the end node 62g having the word key "7". The parser 14 is able to determine that the input word "watch" is a known command word based on parsing the tree 23 to reach the end node 62j having the word key "A".

Figure 3A:
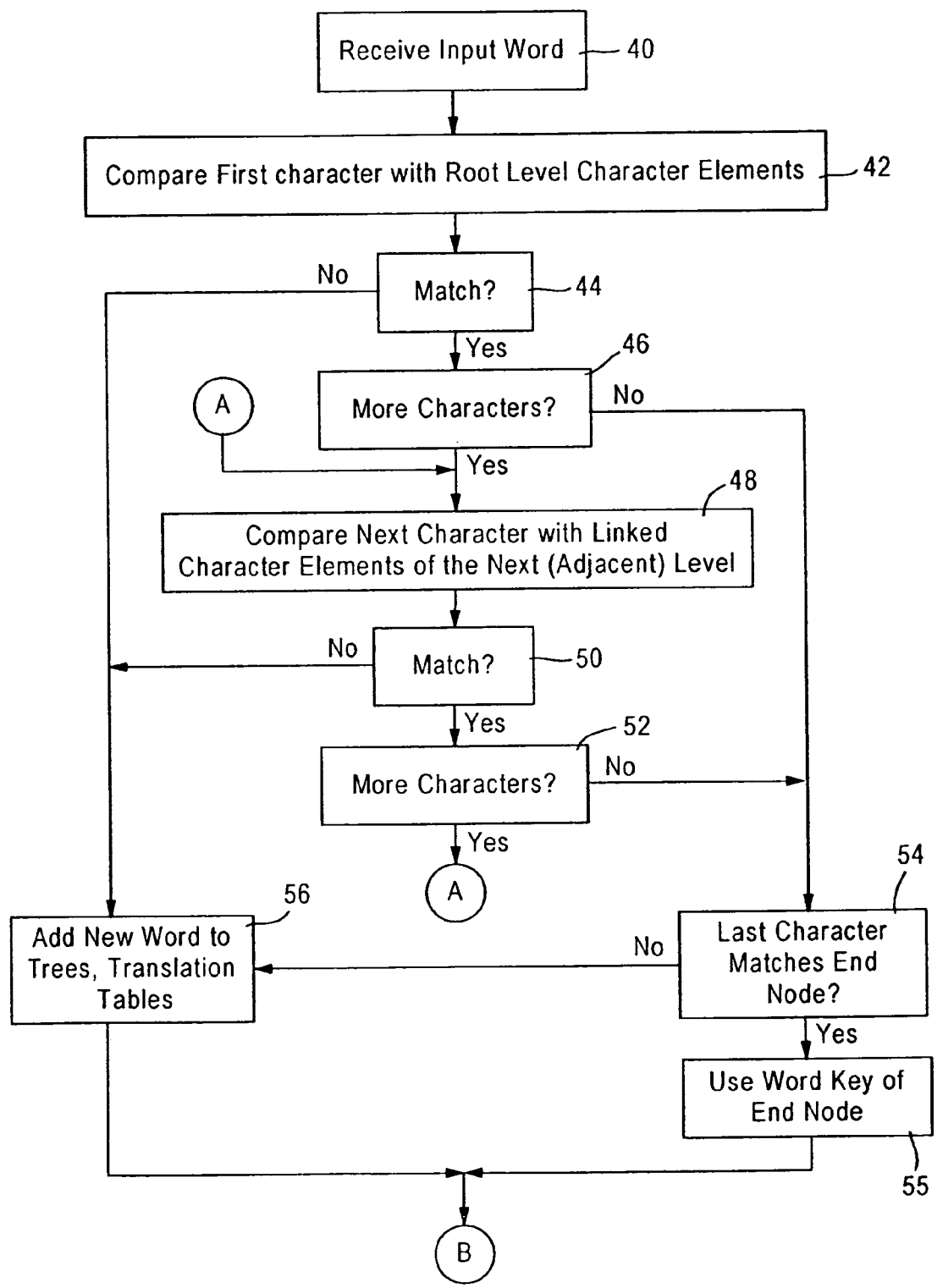
FIGS. 3A and 3B are diagrams summarizing the method of validating and adding generic commands by the parser of FIG. 1 according to an embodiment of the present invention.
Figure 3B:
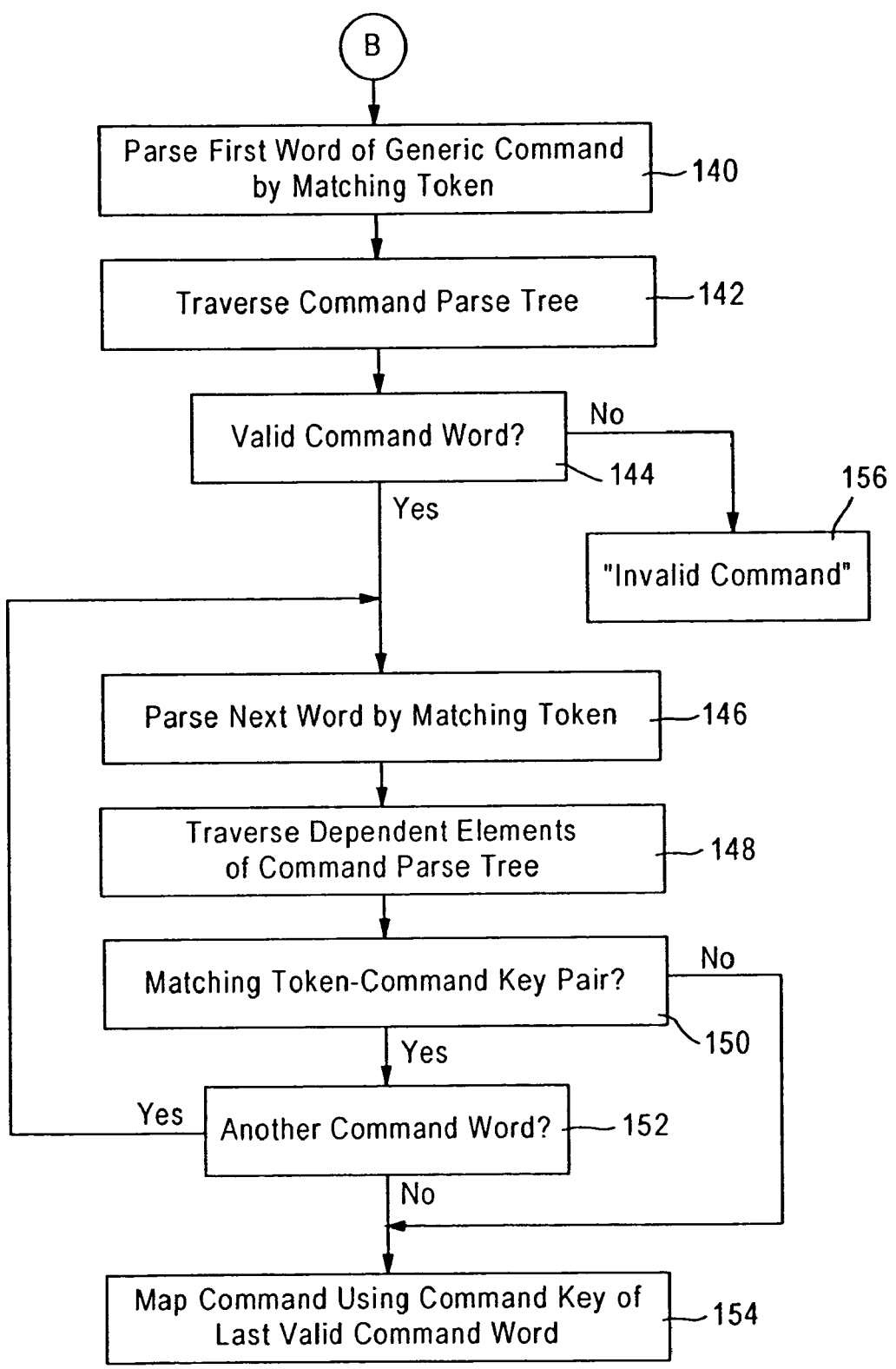

FIGS. 3A and 3B are diagrams summarizing the method of validating a received generic command and translating the received generic command into a command for a specific management program according to an embodiment of the present invention. The operations described with respect to FIGS. 2A, 2B, 3A, and 3 can be implemented as executable code that is stored on a computer readable medium (e.g., a hard disk drive, a floppy drive, a random access memory, a read only memory, an EPROM, a compact disk, etc).

The method begins in step 40, where the parser 14 receives an input word from the user input interface 12. The parser 14 compares in step 42 the first character of the input word with the character elements 62a, 62d at the root level 60a. If in step 44 the parser 14 does not detect a match between the first character and the root level character elements, the parser 14 notifies the tree management process 15, causing the tree management process 15 to add in step 56 the new word to the trees 22 and 23, as well as the translation table 20. If the parser 14 detects in step 44 a match between the first character and one of the root level character elements, the parser checks in step 46 whether there are additional characters for comparison. If there are more characters for comparison, the parser 14 compares the next character with the linked character elements of the next (adjacent) level in step 48 and checks for a match in step 50, similar to step 44. The parser 14 then checks for more characters in step 52, and continues until all characters of the input word have been parsed relative to the tree 23.

After all the characters of the input word have been parsed, if the parser 14 determines in step 54 that the last matching character does not correspond to an end node (i.e., the matching character element 62 for the last character was not an end node), the tree management process adds the new word in step 56; however if the last matching character corresponds to an end node (e.g., 62c, 62g, or 62j), the parser 14 identifies in step 55 the command word by the corresponding word key in the end node. Hence, the new word can be dynamically added to the data structures, without the necessity of manual manipulation by a software engineer.

FIG. 3B illustrates validation of the generic command following identification of an input word as a new command word or a known command word. The parser begins in step 140 by parsing the first word of the received generic command by comparing the first input command word to the command word translation table 20 for identification of a matching token 28. For example, assume that the parser 14 receives the valid command "watch tcp connections". The parser identifies the token value "8" as corresponding to the first command word "watch". The parser 14 than traverses the command parse tree 22 in step 142 to search for the matching token 28. As illustrated in FIG. 2A, the parser 14 locates the matching token in the first tree element 24a. If the parser 14 determines in step 144 that the first command word is valid, the parser 14 continues searching the next command word in step 146. If the first command word is invalid based on no match in the first element 24a of the command parse tree, the parser 14 returns an invalid command message to the user in step 156.

The parser 14 then parses the next word (e.g., "tcp") of the received generic command in step 146 by locating the corresponding token 28 (e.g., "6" for "tcp") in the table 20, and then traversing in step 148 the tree elements that depend from the matched tree element 24a (e.g., 24b). The parser 14 determines a match between the token 28 ("6") corresponding to the command word "tcp" in the token-command key pair 30d in step 150, enabling the parser to continue for the next command word. As described above, the parser 14 repeats the process in step 152 for the third command word "connections" having the token "2" and identifying a match between the entire generic command and the token-command key 30 specified in the tree element 24c. The parser 14 identifies in step 154 the prescribed command for a selected one of the translators 16 based on the value of the command key 32 within the matching token-command key pair 30 (e.g., "CK=3") of the last valid command word, which maps to a translation table that specifies a specific command for a specific translator 16.

As described above, the parser 14 can identify a command key 32 even if only a portion of the command is valid. Assume for example that the parser 14 receives the invalid command "get udp connection info". In this case, the individual command words are valid from the command word translation table 20, however, the sequence is invalid. In particular, the command word "get" having a token value of "3" reaches the token-command key pair 30b, however the command word "udp" having a token value of "7" does not reach any child of the tree element 24a. Hence, the parser 14 uses the last valid command key ("6") in step 154 based on the matching token for the first valid word located in the token-command key pair 30b. The command key is mapped to a selected one of the translators 16 in an attempt to provide a command to the corresponding resource 18. If the selected resource 18 determines that the command is invalid, the selected resource 18 at that time may prompt the user for a correct command.

The disclosed arrangement enables the use of generic commands for multiple OAM tools that have respective command syntax, resulting in a single point of entry for administering and maintaining complex software based systems. The disclosed arrangement provides the user a single set of commands and syntax to learn, facilitating the use of multiple administrative and maintenance tools. Moreover, the disclosed arrangement enables new command words to be identified and automatically added without manual reconfiguration of executable code or data structures.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system configured for executing a plurality of management programs according to respective command formats, the system comprising:

a parser configured for accessing a character-based command parse tree, for identifying whether an input word of a generic command received from a user is a new command word, and a command parse tree for validating the generic command;

a tree management process configured for selectively adding the input word to the character-based command parse tree and the command parse tree based on a determination that the input word is a new command word; and a plurality of translators configured for issuing commands for the management programs according to respective command formats, the parser outputting a prescribed command to a selected one of the translators based on the validating of the generic command;

wherein the character-based command parse tree is configured for identifying known command words, the character-based command parse tree having a root level including a group of first character elements including respective initial characters of the known command words, and at least one adjacent level having at least one linked character element referenced by one of the first character elements, the at least one linked character element configured for identifying a corresponding successive character of one of the known command words.

2. The system of claim 1, wherein the parser is configured for identifying whether the input word is a new command word based on a determined absence of a match for one character of the input word relative to the at least one linked character element.

3. The system of claim 1, wherein the parser is configured for identifying the input word as one of the known command words based on a sequence of characters of the input word matching character elements within the character-based parse tree, ending with an end node, for one of the known command words.

4. The system of claim 1, wherein the command parse tree is configured for specifying valid generic commands relative to a prescribed generic command format and having elements each specifying at least one corresponding generic command component and a corresponding at least one command action value, the parser identifying one of the elements as a best match relative to the generic command, the parser outputting the prescribed command based on the identified one element.

5. The system of claim 4, wherein the parser comprises a command word translation table configured for storing for each prescribed command word a corresponding token for identification of a matching token, the parser configured for determining a presence of the matching token within the command parse tree for each input command word.

6. The system of claim 5, wherein the parser recursively traverses the command parse tree based on an order of the input command words for identification of the matching token within the identified one element.

7. The system of claim 6, wherein the parser validates at least a portion of the generic command by identifying the one element having the best match relative to the portion of the generic command.

* * * * *